United States Patent
Thubert et al.

(10) Patent No.: US 7,649,852 B2
(45) Date of Patent: *Jan. 19, 2010

(54) ARRANGEMENT FOR ROUTER ATTACHEMENTS BETWEEN ROAMING MOBILE ROUTERS IN A CLUSTERED NETWORK

(75) Inventors: Pascal Thubert, La Colle sur Loup (FR); Patrick Wetterwald, Cagnes sur Mer (FR); Marco Molteni, Antibes (FR); David Charlton Forster, Reading (GB)

(73) Assignee: Cisco Technology, Inc., San Jose, CA (US)

( * ) Notice: Subject to any disclaimer, the term of this patent is extended or adjusted under 35 U.S.C. 154(b) by 392 days.

This patent is subject to a terminal disclaimer.

(21) Appl. No.: 11/654,625

(22) Filed: Jan. 18, 2007

(65) Prior Publication Data

US 2007/0183346 A1 Aug. 9, 2007

Related U.S. Application Data

(63) Continuation of application No. 10/281,112, filed on Oct. 28, 2002, now Pat. No. 7,190,678.

(51) Int. Cl.
*H04B 7/00* (2006.01)
*H04L 12/28* (2006.01)

(52) U.S. Cl. .................. 370/254; 370/310; 370/401; 370/408

(58) Field of Classification Search .............. 370/254, 370/256, 310, 315, 329, 338, 351, 389, 400, 370/401, 408; 455/450, 452.1, 452.2
See application file for complete search history.

(56) References Cited

U.S. PATENT DOCUMENTS

| | | |
|---|---|---|
| 2002/0039367 A1 | 4/2002 | Seppala et al. |
| 2002/0061009 A1 | 5/2002 | Sorensen |
| 2004/0032852 A1 | 2/2004 | Thubert et al. |
| 2004/0057440 A1 | 3/2004 | Thubert et al. |

OTHER PUBLICATIONS

Ernst et al., "Network Mobility Support Terminology", Internet Engineering Task Force (IETF), Internet Draft, draft-ernst-monet-terminology-00.txt, Feb. 2002.

(Continued)

*Primary Examiner*—Aung S Moe
*Assistant Examiner*—Kerri M Rose
(74) *Attorney, Agent, or Firm*—Leon R. Turkevich

(57) ABSTRACT

A mobile router is configured for attaching to a selected router in a clustered network (e.g., a mobile ad hoc network) based on identifying a network topology model of the clustered network from received router advertisement messages that include tree information option fields specifying attributes of the network topology model. The mobile router selects which router advertisement originator to attach to based on correlating the attributes of the router advertisement originators relative to identified priorities, and orders the router advertisement originators within a default router list based on the identified priorities. If the mobile router detects a router from a second clustered network, the mobile router advertises to the attachment router that the second clustered network is reachable, enabling the two clustered networks to communicate using a point-to-point link between the respective attachment routers.

16 Claims, 5 Drawing Sheets

OTHER PUBLICATIONS

Baker, "An outsider's view of MANET", IETF Network Working Group, Internet Draft, draft-baker-manet-review-01, Mar. 17, 2002.

Johnson et al., "Mobility Support in IPv6", IETF Mobile IP Working Group, Internet Draft, draft-ietf-mobileip-ipv6-18.txt, Jun. 1, 2002.

Wakikawa et al., "Global connectivity for IPv6 Mobile Ad Hoc Networks", IETF Mobile Ad Hoc Networking Working Group, Internet Draft, draft-wakikawa-manet-globalv6-01.txt, Jul. 1, 2002.

Thubert et al., "IPv6 Reverse Routing Header and its application to Mobile Networks", IETF Network Working Group, Internet Draft, draft-thubert-nemo-reverse-routing-header-00, Jun. 19, 2002.

Garcia-Luna-Aceves et al., "Source Tree Adaptive Routing (STAR) Protocol", IETF MANET Working Group, Internet Draft, draft-ietf-manet-star-oo.text, Oct. 22, 1999.

Narten et.al., "Neighbor Discovery for IP Version 6 (IPv6)", IETF Network Working Group, Request for Comments 2461, Dec. 1998.

Soliman et al., "Hierarchical MIPv6 mobility management (HMIPv6)", IETF Mobile IP Working Group, Internet Draft, draft-ietf-mobileip-hmipv6-06.txt, Jul. 2002.

Di Caro et al., "AntNet: A Mobile Agents Approach to Adaptive Routing", Technical Report IRIDIA 97-12, 1997, pp. 1-27, Brussels, Belgium.

Jiang et al., "Cluster Based Routing Protocol (CBRP) Functional Specification", IETF Draft, http://www.ietf.org/proceedings/98dec/I-D/draft-ietf-manet-cbrp-spec-00.txt, Sep. 1998.

Chiang et al., "Routing in clustered multihop, mobile wireless networks with fading channel", IEEE Singapore International Conference on Networks 1997, Mar. 1997, pp. 197-211.

ARRANGEMENT FOR ROUTER ATTACHEMENTS BETWEEN ROAMING MOBILE ROUTERS IN A CLUSTERED NETWORK

This application is a continuation of commonly-assigned, application Ser. No. 10/281,112, filed Oct. 28, 2002 now U.S. Pat. No. 7,190,678.

BACKGROUND OF THE INVENTION

1. Field of the Invention

The present invention relates to establishment and management of a mobile network by mobile routers, where the mobile network is capable of changing its point of attachment to a wide area network (e.g., the Internet) and thus its reachability in its associated topology.

2. Description of the Related Art

Proposals have been made by Internet Engineering Task Force (IETF) groups for improved mobility support of Internet Protocol (IP) based mobile devices (e.g., laptops, IP phones, personal digital assistants, etc.) in an effort to provide continuous Internet Protocol (IP) based connectivity. For example, the ETF has a Mobile IP Working Group that has developed routing support to permit IP nodes (hosts and routers) using either IPv4 or IPv6 to seamlessly "roam" among IP subnetworks. In addition, the Mobile Networks (MONET) group (renamed as the Network Mobility (NEMO) group) has published different Internet Drafts, available on the World Wide Web at the Network Mobility Home Page at the address http://www.nal.motlabs.com/monet/. One exemplary Internet Draft by Thierry Ernst, entitled "Network Mobility Support Terminology", February 2002, is available on the World Wide Web at the address: http://www.nal.motlabs.com/monet/drafts/draft-ernst-monet-terminology-01.txt, the disclosure of which is incorporated in its entirety herein by reference.

For example, Ernst describes an exemplary mobile network that can be deployed within an airplane, where passengers establish an IP connection of their respective IP host devices (e.g., laptop, digital telephone, personal digital assistant, etc.) to a mobile router within the airplane for on-board Internet access; during the flight, the mobile router within the aircraft may change its point of attachment to the Internet via distinct Internet Service Providers (ISPs), for example by changing connections via respective radio links or geostationary satellite links for transoceanic flights. Note that a passenger also may have his or her own network (i.e., a personal area network) within the mobile network.

According to the NEMO group, a mobile network may be composed by one or more IP subnets and is connected to the global Internet via one or more Mobile Routers (MR). The mobile router has at least two network interfaces: an egress interface toward the wide area network, and an ingress interface from within the mobile network. Mobile network nodes may include local fixed nodes (LFN) (nodes unable to change their point of attachment while maintaining ongoing sessions), local mobile nodes (LMN) (mobile nodes that belong to the mobile network and able to change their point of attachment within the mobile network or outside the mobile network), and visiting mobile nodes (VMN) (mobile nodes that not belong to the mobile network and that can change their point of attachment from outside the mobile network to inside the mobile network). Each of the nodes may be either a host or a router.

Hence, a mobile router is a router configured for establishing a communication link between the mobile network and an attachment router of a wide area network, such as the Internet, providing connectivity for the mobile network to the wide area network. The mobile router thus serves as a gateway to route packets between the mobile network and the Internet.

The IETF also has a Mobile Ad-hoc Networks (MANET) Working Group that is working to develop standardized MANET routing specification(s) for adoption by the ETF. According to the MANET Working Group, the "mobile ad hoc network" (MANET) is an autonomous system of mobile routers (and associated hosts) connected by wireless links— the union of which form an arbitrary graph. The routers are free to move randomly and organize themselves arbitrarily; thus, the network's wireless topology may change rapidly and unpredictably. Such a network may operate in a standalone fashion, or may be connected to the larger Internet.

The MANET system is particularly suited to low-power radio networks that may exhibit an unstable topology, where wireless propagation characteristics and signal quality between a wireless transmission source and a receiver can be difficult to model and quantify. In a MANET, the device address is tied to the device, not a topological location, as there is no fixed network infrastructure. When the addressed device moves, therefore, the motion changes the routing infrastructure. Hence, as described in an Internet Draft by Baker, entitled "An Outsider's View of MANET", available from the IETF on the World Wide Web at the address http://www.ietf.org/internet-drafts/draft-baker-manet-review-01.txt (the disclosure of which is incorporated in its entirety herein by reference), the fundamental behavior of a MANET is that a routing node carries with it an address or address prefix, and when it moves, it moves the actual address; when this happens, routing must be recalculated in accordance with the new topology. For example, each mobile router retains its address prefix; hence, neighboring mobile routers in a MANET may have distinct address prefixes.

Although existing MANET protocols focus on the internal connectivity within the unstable topology between mobile devices, the existing MANET protocols suffer from the disadvantage that they provide a poor model for connecting to a wide area network such as the Internet. In particular, MANET proactive protocols allow the mobile nodes to build routing tables for the MANET space, distinct from the routing infrastructure. In addition, existing routing protocols such as Open Shortest Path First (OSPF) Protocol (as specified by the IETF Request for Comments (RFC) 1583), or Intermediate System-to-Intermediate System (IS-IS) protocol (specified by the International Organization for Standardization document ISO 10589) may require up to a minute to converge (i.e., complete protocol communications necessary to establish a connection) and hence not be able to converge quickly enough for a mobile router that is moving from one location to another. For example, in the case of two vehicles passing each other, each having a mobile router, there may exist approximately ten seconds for the mobile routers to establish a connection; hence, routing protocols requiring up to a minute to converge would be unable to establish a connection.

A "Mobile IPv6" protocol is disclosed in an Internet Draft by Johnson et al., entitled "Mobility Support in IPv6", available on the World Wide Web at the address: http://www.ietf.org/internet-drafts/draft-ietf-mobileip-ipv6-18.txt (the disclosure of which is incorporated in its entirety herein by reference). According to Johnson et al., the Mobile IPv6 protocol enables a mobile node to move from one link to another without changing the mobile node's IP address. Hence, a mobile node is always addressable by its "home address", an IP address assigned to the mobile node within its home subnet prefix on its home link. Packets may be routed to the mobile node using this address regardless of the mobile node's current point of attachment to the Internet. The mobile node may also continue to communicate with other nodes (stationary or mobile) after moving to a new link. The movement of a mobile node away from its home link is thus transparent to transport and higher-layer protocols and applications.

In addition, Johnson et al. assumes that use of Mobile IPv6 eliminates the need to deploy special routers as "foreign agents" as are used in Mobile IPv4. In Mobile IPv6, mobile nodes make use of IPv6 features, to operate in any location without any special support required from the local router.

Still another protocol is suggested in an Internet Draft by Wakikawa et al., entitled "Global Connectivity for IPv6 Mobile Ad Hoc Networks", available on the World Wide Web at the address: http://www.ietf.org/internet-drafts/draft-wakikawa-manet-globalv6-01.txt (the disclosure of which is incorporated in its entirety herein by reference). According to Wakikawa et al., a MANET node can obtain a global address from an Internet gateway, and send data to the Internet using a Mobile IPv6 routing header specifying the gateway.

However, requiring all mobile routers to utilize Mobile IPv6 may impose additional processing requirements on the mobile routers, increasing cost and complexity.

Hence, since mobile routers in a MANET may roam rapidly around each other, traditional routing protocols cannot converge rapidly enough to maintain MANET connections for the mobile routers. In addition, since mobile routers in a MANET do not share an address prefix that can be aggregated (i.e., grouped), connectivity to a wide area network such as the Internet becomes problematic. Finally, the boundaries for a given MANET are not precisely defined unless layer 2 access restrictions are imposed, for example using 802.1x authentication.

SUMMARY OF THE INVENTION

There is a need for an arrangement that enables a mobile router to establish a communication link within a mobile ad hoc network in a manner that provides optimum communication performance for the mobile router using existing routing protocols.

These and other needs are attained by the present invention, where a mobile router is configured for attaching to a selected router in a clustered network based on identifying a network topology model of the clustered network from received router advertisement messages that include tree information option fields specifying attributes of the network topology model. The mobile router selects which router advertisement originator to attach to based on correlating the attributes of the router advertisement originators relative to identified priorities, and orders the router advertisement originators within a default router list based on the identified priorities. The mobile router attaches to one of the routers in the ordered default router list having a higher priority, and upon attaching to the router as its attachment router, the mobile router transmits its own corresponding router advertisement message including a corresponding tree option field that specifies the attributes of the mobile router within the network topology model, enabling other routers to selectively connect and/or reconnect within the mobile network based on their respective identified preferences. If the mobile router detects a router from a second clustered network, the mobile router advertises to the attachment router that the second clustered network is reachable, enabling the two clustered networks to communicate using a point-to-point link between the respective attachment routers.

One aspect of the present invention provides a method in a mobile router configured for establishing communications within a clustered network having at least two routers. The method includes detecting within the clustered network a router advertisement message that includes a source address identifying the corresponding router having sent the router advertisement message, and a tree information option field having attributes specifying a network topology model of the corresponding router. The method also includes determining a priority of the network topology model relative to identified priorities, and selectively attaching to the router having sent the router advertisement message based on the determined priority of the corresponding network topology model. The method also includes detecting a new router from a second clustered network, and advertising to the router having sent the router advertisement message that the second clustered network is reachable, enabling communications between the clustered network and the second clustered network.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
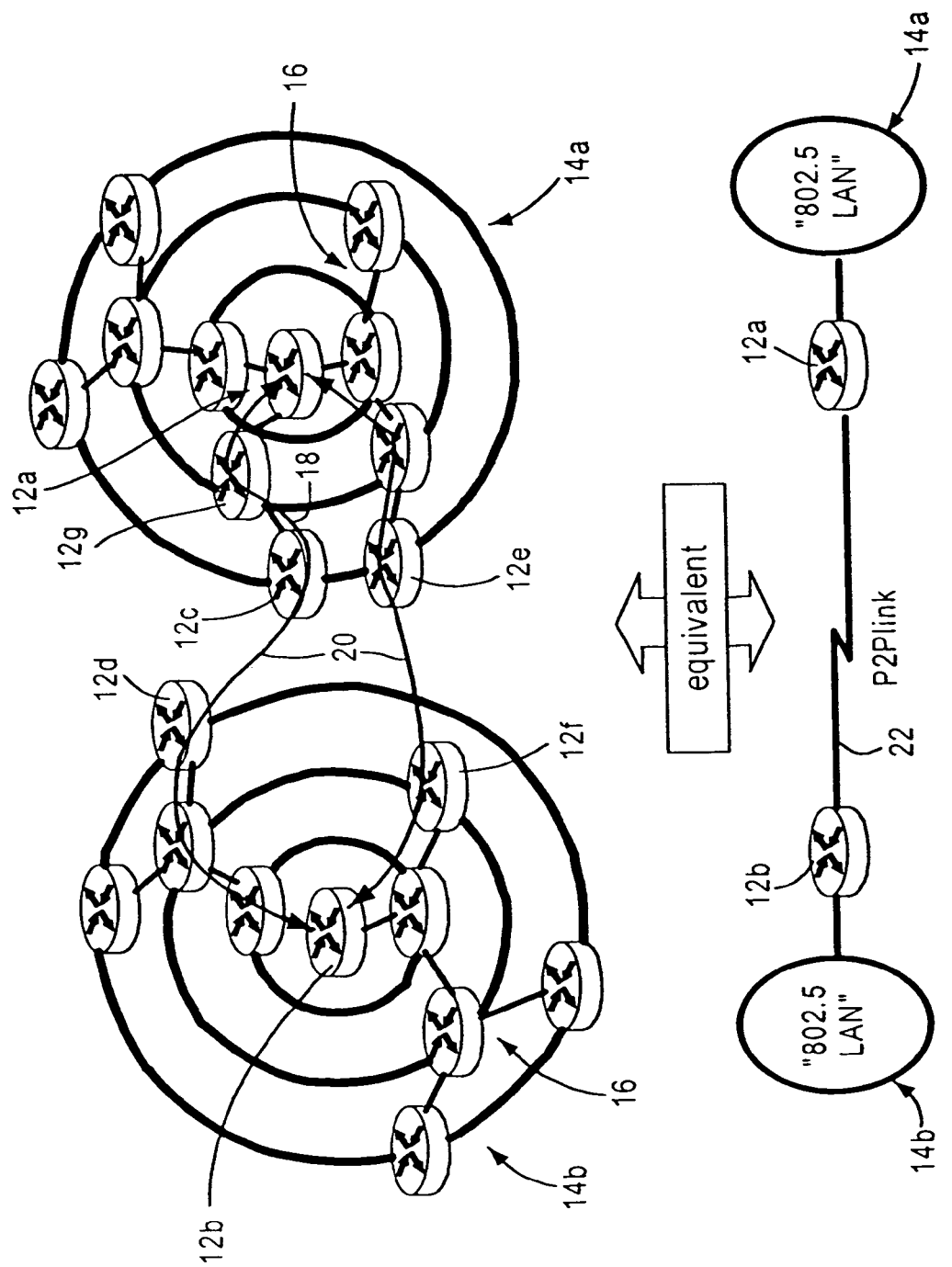
FIG. 1 is a diagram illustrating ad hoc mobile networks, each having a top level mobile router (TLMR) and at least one border router for communication with the other corresponding border router for internetwork communications, according to an embodiment of the present invention.

FIG. 1 is a diagram illustrating a connection methodology of mobile routers 12 within clustered networks 14a and 14b, according to an embodiment of the present invention. The disclosed embodiment is directed to an arrangement for a mobile router 12 to attach to another router 12 in a cluster, for example as within a mobile ad hoc network (MANET) (e.g., 14a) in order to establish an optimized communication within the clustered network. In particular, the routers 12 in a cluster (e.g., 14a) normally create routes based on the total possible meshing at a given point in time. The disclosed embodiment dynamically assembles the layer 2 clusters into a tree-based topology model 16 in order to optimize mobile IP operations.

In particular, disclosed embodiment utilizes the attachment techniques described in commonly-assigned, copending application Ser. No. 10/218,515, filed Aug. 15, 2002, entitled "ARRANGEMENT FOR OPTIMIZING CONNECTIONS BETWEEN ROAMING MOBILE ROUTERS IN A MOBILE NETWORK", the disclosure of which is incorporated in its entirety herein by reference.

According to the disclosed embodiment, the tree-based topology model 16 is organized into a cluster, where each top level mobile router (TLMR), determined by having the highest relative preference values visible to other mobile routers, serves as a clusterhead (i.e., a root of a tree). Internal communications within the cluster 14a or 14b may be optimized using the proactive Optimized Routing Algorithm (ORA) MANET protocol. All the mobile nodes 12 register with the TLMR, enabling the TLMR to know the source route path to all the prefixes in the cluster. Consequently, the tree-based topology model can emulate a source-route LAN (e.g., an IEEE 802.5 LAN), for which the TLMR acts as a gateway and the other mobile routers serve as a Source Route Bridge.

In addition, two clusters 14a and 14b overlap when border routers (e.g, 12c and 12d) from respective clusters detect each other. In this case, a border router (e.g., 12c), in response to detecting a router advertisement message from peer border router (e.g., 12d), sends a router advertisement message to its corresponding TLMR (e.g., 12a) indicating that the second cluster 14b is reachable. The TLMR (e.g., 12a) stores the path 18 by parsing the source route header from the received router advertisement message.

Each TLMR (e.g., 12a) detects the available border intersystem links 20, where each link 20 is implemented as a unidirectional source route path. As described in detail below with respect to FIG. 6, each TLMR (e.g., 12a) establishes a virtual tunnel 22 with the corresponding TLMR (e.g., 12b) of the overlapping cluster (e.g., 14b) based on selecting an individual link 20 for routing of a datagram destined for the overlapping cluster (e.g., 14b).

Once each TLMR has established the virtual tunnel 22 based on the availability of multiple border intersystem links 20, the TLMRs 18a and 18b exchange routing information, via the virtual tunnel 22, about the mobile networks in their respective clusters 16 using router advertisement messages. Each TLMR (e.g., 12a) of a cluster (e.g., 14a) represents the members of that cluster (e.g., 14b) for any communication with the overlapping cluster (e.g., 14b). Hence, the TLMRs 12a and 12b can communicate via the respective border routers (e.g., 12c and 12d, or 12e and 12f), using a virtual tunnel 22 that emulates a point-to-point link across a selected border intersystem link 20, enabling each cluster 14a and 14b to emulate a source route based local area network (LAN) interconnected by IP gateways.

As described in detail below, each mobile router "attaches" to an attachment router by selecting a default router as an attachment router, and registering with the attachment router to be a member of the tree. Various proposals have been presented to the Internet Engineering Task Force (IETF) for a mobile router to attach to a mobile network according to IPv6 protocol, including Thubert et al., "IPv6 Reverse Routing Header and its Application to Mobile Networks", Jun. 19, 2002, the disclosure of which is available on the World Wide Web at http ://www.ietf.org/internet-drafts/draft-thubert-nemo-reverse-routing-header-00.txt and is incorporated in its entirety herein by reference. The disclosed embodiment expands on the disclosure of the above-incorporated Thubert et al. by providing a methodology for the mobile router to attach to an attachment router for connectivity in the clustered network.

In particular, the mobile router 12 selects an attachment router from its default router list, and uses it as its default router; router information in the internal default router list is obtained using known router discovery techniques, and by detecting unsolicited router advertisement messages. The router advertisement messages may include a tree information option, described in the above-incorporated Thubert et al., enabling the mobile router to store within the default router list the attributes of each detected router, as well as the attributes of the tree to which the detected router is attached. The mobile router selects its attachment router from the internal default router list based on configurable network interface and group options, and based on a preference-based attachment hierarchy, described below.

Once the mobile router selects a default router to be used as an attachment router, the mobile router sends a registration request to the TLMR via the routing protocol used inside the cluster, e.g., MANET protocol, or an extension of Mobile IP. If the attachment router deems itself to be a TLMR and has access to a wide area network such as the Internet, the TLMR acts as a gateway on behalf of the routers 12 in its cluster system. For example, the TLMR may send its IP address as an updated care-of-address, enabling the datagrams to be sent to a mobile router via a tunnel terminating at the TLMR based on the updated care-of address. Additional details regarding the TLMR acting as a gateway to register on behalf of the routers 12 is disclosed in commonly-assigned, copending application No. 10/247,512, filed Sep. 20, 2002, entitled "ARRANGEMENT IN A GATEWAY FOR REGISTERING MOBILE ROUTERS OF A MOBILE AD HOC NETWORK TO RESPECTIVE HOME AGENTS", the disclosure of which is incorporated in its entirety herein by reference.

Hence, the TLMRs can store, within their routing tables: a default route to a wide area network (e.g., the Internet) via their attachment router (as described in the above-incorporated application 10/218,515); paths to the prefixes inside their cluster (as described in the above-incorporated application 10/247,512); and traditional routs from a standard routing protocol to the mobile networks in the connected clusters via the respective TLMRs 12a and 12b via the virtual tunnel 22.

The following text and accompanying drawings will provide additional details for the improved arrangement for a mobile node to attach to a mobile network.

Figure 2:
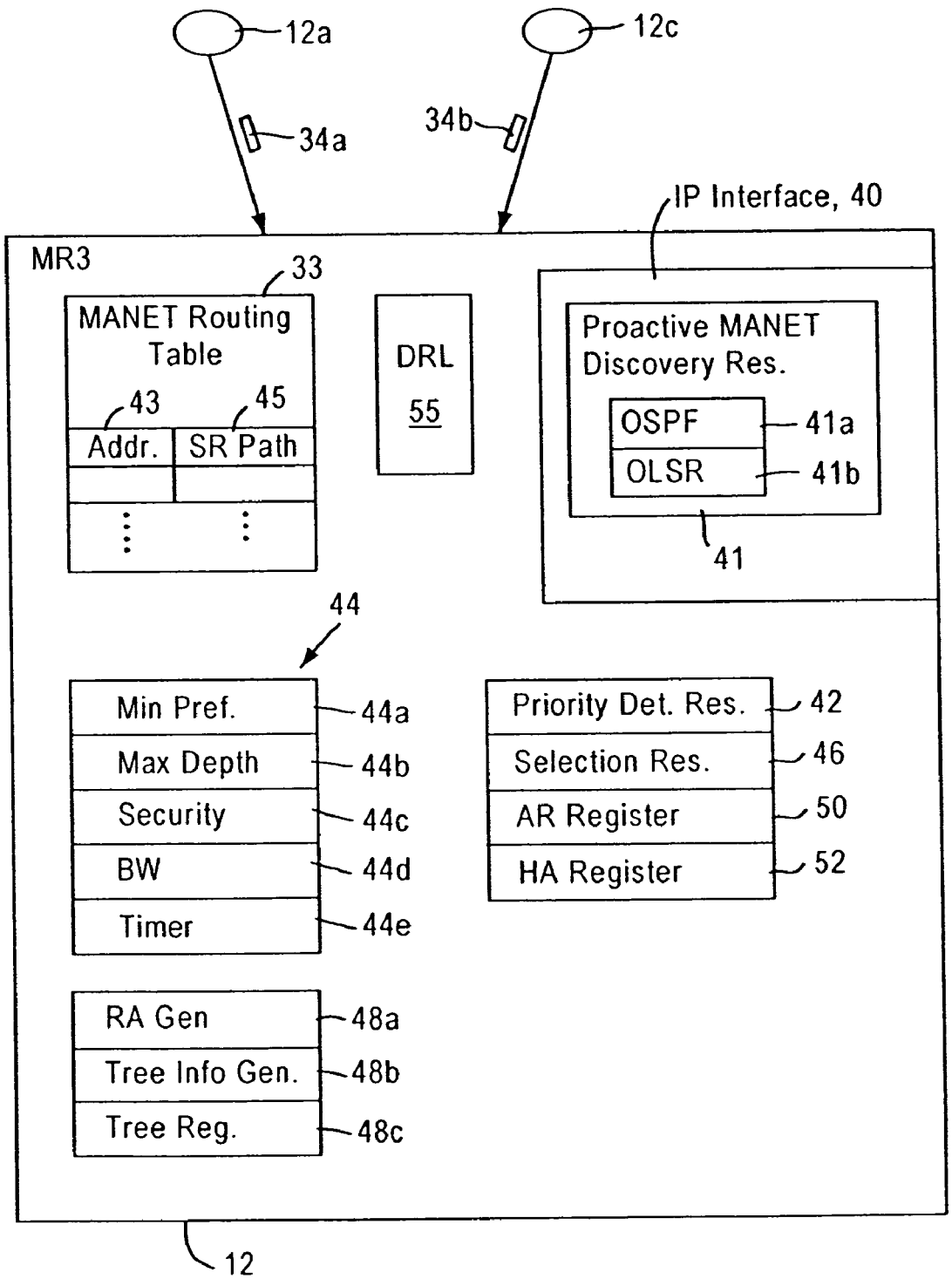
FIG. 2 is a diagram illustrating one of the mobile routers of FIG. 1.

FIG. 2 is a diagram illustrating a mobile router 12 (e.g., "MR3") configured for attaching to another mobile router 12 in the cluster (e.g., 14a) via a link (e.g., an 802.11 wireless link) based on router advertisement messages (e.g., 34a, 34b) having tree information option fields specifying mobile network topology models, according to an embodiment of the present invention. The disclosed router 12 enables mobile IP-based nodes to automatically establish a dynamic mobile network that provides optimized network topology models 16, according to selected routing constraints, based on IPv6 protocol.

In particular, each mobile router (e.g., 12a, 12c, etc.) outputs a router advertisement (RA) message (e.g., 34a) that enables other routers to independently determine whether to associate with (i.e., attach to) the corresponding router, also referred to as the router advertisement (RA) originator, based on the corresponding RA message. Hence, the mobile router 12 (e.g., "MR3"), upon receiving an RA message 34a (or 34b) from a router 12a (or 12c), selects whether to attach to the corresponding router advertisement originator 12a (or 12c) having output the RA message based on attributes supplied by the RA message, described below. The mobile router 12 associates with the router advertisement originator (e.g., 12a) by storing the information in the RA message in its default router list 55, and selecting the source of the RA message as its attachment router; the mobile router 12 then sends a registration message to the attachment router to request it to be a member of the tree.

If the attachment router having received the registration message is at the top of the tree 16 (i.e., is a TLMR), the TLMR (e.g., 12a) registers the mobile router 12 as a mobile router having sent the registration message and stores the address prefix, plus the route path specified by the Source Routing. If the attachment router having received the registration message is not a TLMR, the attachment router forwards the registration message "up the tree" to its own attachment router.

The independent selection by each router of whether to attach to another router enables the routers to dynamically establish a tree-based network topology model, where each router may continually determine whether an alternate attachment point within the tree is preferred.

The router 12 includes an IP network interface 40, for example an IPv6 or mobile IPv4 network interface utilizing, for example, a wireless 802.11 link. The IP network interface 40 includes a proactive discovery resource 41 configured, for example, for execution of MANET protocol communications within the cluster (implemented, for example, as a MANET). Exemplary proactive MANET protocol resources 41 that may be utilized for identifying the mobile routers 12 include an OSPF (ver. 3) resource 41a, configured for monitoring link connectivity information advertised by each mobile router 12 in the MANET, and also configured for maintaining a routing table 33; another routing protocol that may be used is Source Tree Adaptive Routing (STAR) protocol, described in an Internet Draft by J. J. Garcia-Luna-Aceves et al., available from the IETF on the World Wide Web at http://www.ietf.org/proceedings/99nov/I-D/draft-ietf-manet-star-00.txt. The routing table 33 is configured for storing IP addresses 43 of the mobile routers 12 and associated connectivity and source routing (SR) information (e.g., link state status, etc.) 45. The protocol resources 41 also may includes an Optimized Link State Routing (OLSR) Protocol resource 41b, configured for identifying the mobile routers 16 using hello messages and link state flooding to populate the routing table 33. Additional information regarding the MANET protocol resources 41 is described in the above-incorporated Internet Draft by Baker.

The IP interface also is configured for detecting the router advertisement messages (e.g., 34a, 34b) from the routers (e.g., 12a, 12c, etc.). As described below, a selection resource 46 determines whether to store the information from the router advertisement messages 34 into a default router list (DRL) 55. The router 12 also includes a priority determination resource 42 configured for parsing each entry of the default router list 55 based the information obtained from the received router advertisement messages (e.g., 34a) to determine the priority of the corresponding network topology model 16 relative to identified priorities, including locally stored priorities that are stored in local registers 44, and ordering the entries in the default router list 55 based on the respective attributes and the identified priorities.

As described below, the local registers 44 may include a minimum preference register 44a configured for storing a minimum preference value, a maximum depth register 44b configured for storing a prescribed maximum depth value, a security register 44c configured for storing any prescribed security attributes that may be required for connection according to a network administrator, and a minimum bandwidth register 44d configured for storing a minimum bandwidth requirement for the attachment router 12.

The router 12 also includes a selection resource 46 configured for selectively attaching to one of the routers (e.g., 12a) based on the determined priority of the corresponding router (e.g., 12a) and its corresponding network topology model 16 (i.e., its position within the tree) 16 from the corresponding RA message (e.g., 34a). As described below, the selection resource 46 can be implemented as executable code configured for initiating selection operations in response to reception of a router advertisement message, or a timeout of a tree management related timer, a tree hop timer, or a router expiration timer.

The router 12 also includes resources 48 for generating RA messages. For example, the router 12 includes a router advertisement generation resource 48a configured for outputting its own router advertisement messages 34, according to IP protocol. In addition, the router advertisement generation resource 48a includes a tree information option generation resource 48b configured for generating a tree information option field, described with respect to FIG. 3, based on the mobile router 12 having a connection with a tree (i.e., a network topology model) 16 within the cluster (e.g., 14a). The router 12 also includes a bind update resource 48c configured for generating a bind update message (i.e., a registration request) for a TLMR for the mobile router 12, in accordance with the above-incorporated Thubert et al. document (available at http://www.ietf.org/internet-drafts/draft-thubert-nemo-reverse-routing-header-00.txt) and the Request for Comments (RFC) 2461, Neighbor Discovery for IP version 6 (IPv6), published by the IETF.

The router 12 also includes an attachment router register 50 configured for specifying the IP address for a current attachment router selected by the mobile router 12 from the default router list 55 to access its TLMR specified by the corresponding IP address in the register 52. Alternatively the attachment router register 50 may specify a pointer to an entry in the default router list 55 for the selected router.

Figure 3:
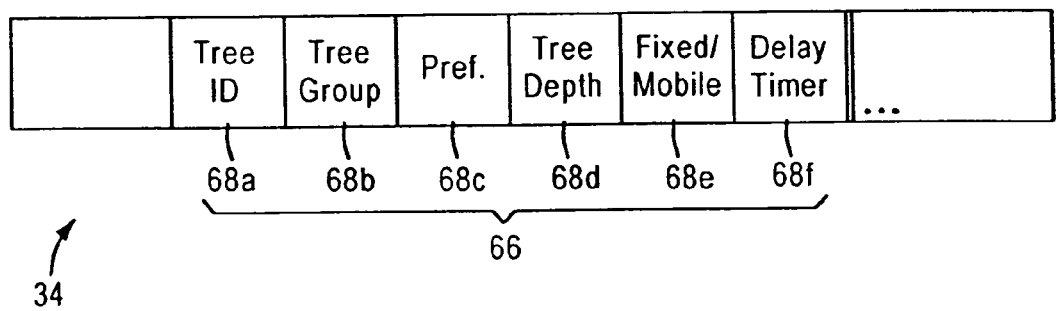
FIG. 3 is a diagram illustrating in detail a router advertisement message having tree information option fields.

FIG. 3 is a diagram illustrating in detail a router advertisement message 34 generated by the router advertisement message generator 48a, according to an embodiment of the present invention. The RA message 34 includes Router Advertisement fields as described in RFC 2461. According to the disclosed embodiment, a tree information option field 66 is added to the RA message 34 that includes attributes 68, generated by the tree information generator resource 48b, that specify the network topology model 16 utilized by the router advertisement originator 12, identified by its corresponding IP source address (SA) in the IPv6 header.

For example, the tree information option field 66 includes a tree identifier 68a, a tree group identifier 68b, a preference field 68c, a tree depth field 68d, a fixed/mobile field 68e, and a delay timer field 68f. The tree identifier field 68a is configured for storing an IP address of the top level mobile router, for example an IEEE based 64-bit extended unique identifier (EUI-64) based link local address. The tree group field 68b is configured for storing a tree group identifier, for example an IPv6 address of a mobile router connected to a TLMR, enabling the priority determination resource 42 and the selection resource 46 to distinguish between multiple tree groups (i.e., branches) within the same cluster; hence, the mobile routers 12c and 12e of FIG. 1 would have the same tree identifier 68a, but different tree group fields 68b. The preference field 68c is configured for storing a preference value for the mobile router 12 as stored in the corresponding preference register 54, enabling a mobile router receiving the RA message 34 to decide whether to associate with the source of the RA message 34. The tree depth field 68d is configured for storing the depth of the mobile router 12 within the tree 16, as specified by the tree information generation resource 48b, enabling other routers receiving the RA message 34 to determine the relative position of the router advertisement originator within the tree 16. The fixed/mobile field 68e is configured for specifying whether the corresponding tree 16 is a grounded tree or a floating tree. In particular, a tree 16 is deemed to be fixed if the top level mobile router is connected to a fixed router. The delay timer field 68f is configured for storing a prescribed delay interval utilized by other routers to delay subsequent topology changes, thereby delaying propagation of subsequent RA messages in response to the RA message 34.

The tree information option (TIO) 66 also may include a path checksum field (not shown in FIG. 3), enabling a mobile router to determine whether the path through the tree above it has changed or not; in other words, a path checksum change indicates real path change. When propagating a TIO, an intermediate mobile router builds a byte string using the checksum it receives in a TIO and the 16 bytes of its CareOf address; the mobile router then overwrites the checksum in the TIO with the result. This operation is performed at the same time as the tree depth incrementing. The TLMR uses a checksum of zeroes for its computation.

Figure 4:
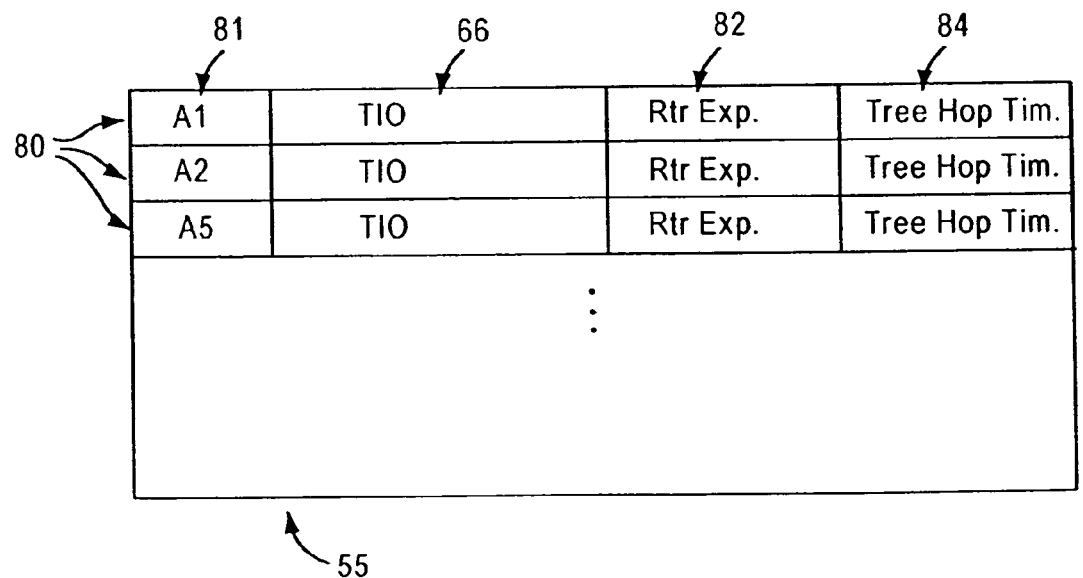
FIG. 4 is a diagram illustrating in detail a default router list configured for storing default router list entries including tree information option fields from received router advertisement messages.

FIG. 4 is a diagram illustrating in detail the default router list 55 of FIG. 3. In particular, the known trees 16 are stored in an ordered list, per order of preference, by extending IPv6 default router lists to include tree information. In particular, each entry 80 of the default router list 55 includes a router address field 81, the TI option fields 66 as received from the router advertisement message 34, a router expiration timer field 82 that specifies information, including timer ID, to determine the expiration of the entry, and a tree hop timer field 84 that specifies information, including a corresponding timer ID, to delay any response to a received RA message in order to provide tree stability, described below.

The timer resource 44e of FIG. 2 is configured for calculating timer values from the timer information stored in the fields 82, 84, to determine if the corresponding timer has expired, requiring priority determination or selection operations. As apparent from the foregoing, any of the resources 42, 46, 48a, 48b, 48c may be implemented as software-based executable resources, or hardware (e.g., firmware, state machine, etc.).

Hence, each router 12 independently determines whether to associate with another router advertisement originator having output an RA message (e.g., 34a, 34b) based on the tree information segment 66 within the RA message 34: the tree information segment 66 specifies attributes 68 about the tree to which the router advertisement originator is associated, including tree identifier, tree depth, and tree preference, and tree mobility (i.e., whether the tree is grounded or floating). Once stored as entries in the default router list 55, the priority determination resource 42 can maintain the known trees in an ordered list, per order of preference: each entry 80 is maintained until the corresponding router expiration timer field 82 expires.

Hence, the tree information segment 66 of the RA message enables mobile routers to advertise the network topology model 16 (i.e., tree) they belong to, and to select and move to the best location within the available trees. Note that fixed routers and a mobile router that has a connecting link to its corresponding home subnet (i.e., the link on which the mobile node's home subnet prefix is defined) do not participate in the tree selection and do not output tree information segments 66. Hence, a mobile router 12 can identify a fixed router based on the determined absence of the tree information segment 66 in a received RA message.

As described in further detail below, the root and nodes of the tree are mobile routers, and the leaves are mobile or fixed hosts. The root of the tree is designated the Top Level Mobile Router (TLMR), and the mobile hosts may be Local Mobile Nodes or Visiting Mobile Node, and the fixed host is also referred to as a Local Fixed Node.

Each mobile router that is not attached to (i.e., associated with) a tree is the Top Level Mobile Router of its own tree. Hence, a stand-alone mobile router is the TLMR of a floating tree. A mobile router that is attached to a fixed router, or that is at home, is the TLMR of a grounded tree. Hence, a grounded tree has a TLMR attached to a fixed router, and a floating tree has a TLMR that is not attached.

If a mobile router performs a change in tree status (e.g., joins a tree, moves within its tree, or when it receives a modified tree information segment from its current attachment router), the mobile router sends an unsolicited RA message on all of its mobile networks that includes the tree information (TI) segment 66 reflecting the change (e.g., sending the TI segment 66 received from the current attachment router, with the tree depth 68d incremented by one). Hence, each mobile router is aware of any modification in the tree it is attached to. Note, however, that in order to avoid an excessive number of RA messages 34 from being propagated throughout a tree, the mobile router 12 will delay its reaction to a new TI option 66 by a delay that is proportional to its tree depth, and the delay time specified within the delay timer field 68f, plus a random time interval that is less than the tree delay time specified by the delay timer field 68f; hence, the higher parts of the tree may move first to a new connection and "drag" their subtree along as a connected subtree. Consequently, mobile routers within the subtree will move after the delay interval to optimize connections based on the new tree configurations.

As described above, each mobile node 12 is configured for independently selecting a connection between different mobile routers. According to the disclosed embodiment, mobile routers can be individually configured by a network engineer to prefer the tree-favored construction illustrated in FIG. 1, where a TLMR (e.g., 12a) is identified as the mobile router having the highest preference value visible to the other mobile routers 12 within the cluster (e.g., 14b). Preference-based network topology models 16 are preferred where the given structure must be enforced, for example in the case of public services or a mobile network deployed on a commercial transportation system, for example a train system, or a fleet of marine vessels. In this case, the clusterhead mobile routers (e.g., 12a, 12b) have the highest relative preference value, for example a preference value of 250; hence, the mobile routers 12a and 12b become the TLMR for their respective clusters 14a and 14b relative to the mobile routers that can detect the presence of these routers (i.e., that are "visible"). Hence, the clusterheads (i.e., TLMRs) of a tree 16 are those mobile routers that have the highest visible preference values. Note that routers (e.g., 12c) that cannot initially detect the TLMR (e.g., 12a) may attach to the TLMR via an intermediate router 12g that "sees" both routers (e.g., 12a and 12c), such that the intermediate router 12g serves as a "bridge" between the two routers in the tree 16.

Hence, the trees 16 maintain a more consistent internal connectivity based on the TLMRs 12a and 12b having the highest preference values.

The mobile router 12 performs attachment router selection based on identifying router entries 80 that belong to an identified group interfaces having the highest interface and group aggregated priority. In particular, each mobile router 12 can be configured with network interface preferences (e.g., radio wireless preferable over infrared wireless) where identified access interface types can either be identified as being preferred, or to be avoided. Similarly, the tree group 68b may specify an IPv6 address for a tree group that is has a highest preference, a reduced preference, or that is to be avoided. Hence, the mobile router may prefer (or avoid) selection of certain entries based on the highest interface and group aggregated priority. Hence, the mobile router 12 may utilize the interface and group aggregated priority to determine whether to remain within a cluster 14a, or whether to move to another cluster 14b.

The mobile router determines, from the entries 80 having the highest interface and group aggregated priority, whether any other entry within the highest interface and group aggregated priority has a preference value 68c higher than the corresponding preference value for the default router specified as the current attachment router in the AR register 50 (note the AR register 50 merely may include a pointer to the router entry 80 storing the router information for the currently-selected default router). Note that if none of the entries 80 having the highest interface and group aggregated priority are reachable, the router may become its own root.

In addition, a router (e.g., 12c or 12e) may detect a new router that is not identified in its routing table 33, indicating that the new router is part of another cluster (e.g., 14b); in this case, the router detecting the new router updates its routing table 33, and sends a message to its TLMR 12a indicating the presence of the new router (e.g., 12d).

Figure 5:
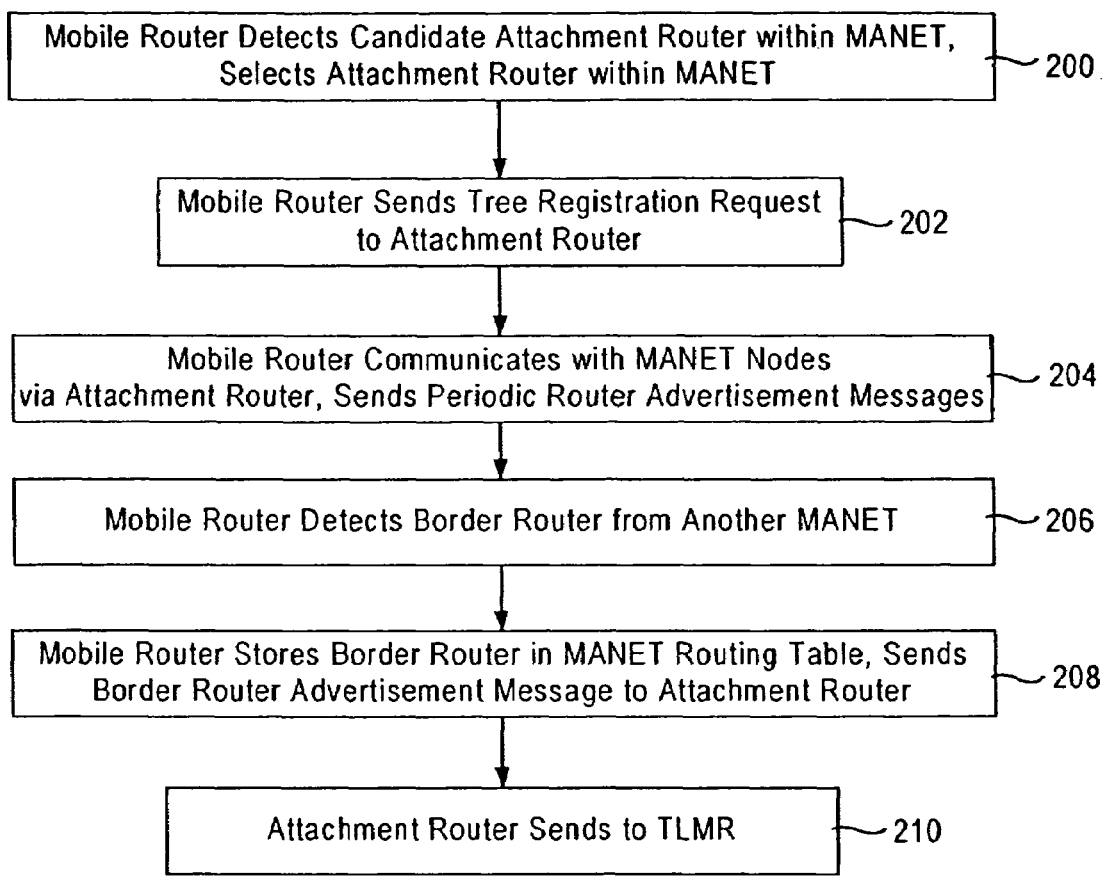
FIG. 5 is a diagram illustrating the method of router attachment within a MANET, including establishing connections between two MANETs via border routers, according to an embodiment of the present invention.

FIG. 5 is a diagram illustrating the method in a mobile router of registering with a TLMR in a clustered network, and selectively establishing an intersystem link with a border router of a second clustered network, according to an embodiment of the present invention. The steps described in FIG. 5 can be implemented as executable code stored on a computer readable medium(e.g., a hard disk drive, a floppy drive, a random access memory, a read only memory, an EPROM, a compact disk, etc.), or propagated via a computer readable medium (e.g., a transmission wire, an optical fiber, a wireless transmission medium utilizing an electromagnetic carrier wave, etc.).

The method begins in step 200, where the mobile router (e.g., 12c) detects a router advertisement message 34 from another mobile router in its cluster (e.g., 14a), for example from the mobile router 12g of FIG. 1, and adds an entry 80 in its default router list 55 based on the received router advertisement message. The selection resource 46 then selects in one of the mobile routers identified in its default router list 55 as an attachment router.

Once the mobile router 12 selects an attachment router, the tree registration resource 48c sends in step 202 a tree registration message to the TLMR via its attachment router; if the attachment router is not the TLMR, the attachment router sends the tree registration message to its attachment router, until the TLMR receives the tree registration message. Since the tree registration message received by the TLMR includes the reverse source route path, the TLMR stores the mobile router IP address 45, plus the associated source-route path 45, in its routing table 33. Hence, the TLMR is able to know the source route path 16 to all the prefixes in the tree, with the time resolution of packet frequency.

Once the mobile router 12 has selected an attachment router, the mobile router 12 communicates in step 204 with other cluster nodes via its attachment router, and outputs periodic router advertisement messages that specify the relative position (i.e. depth) of the router 12 within the tree.

Assume in step 206 that the mobile router (e.g., 12c) of a cluster (e.g., 14a) detects a router advertisement message 34 from a border router (e.g., 12d) of another cluster (e.g., 14b). In this example, the mobile router 12c identifies the border router 12d as belonging to another cluster 14b based on the tree identifier 68a supplied in the router advertisement message from the border router 12d differing from the tree identifier 68 to which the mobile router 12c is attached. Hence, the mobile router 12c stores in step 208 the border router information in its routing table 33, including the address 43 and link information, and sends a border router advertisement message 34 to its attachment router 12g. The attachment router 12g forwards in step 210 the border router advertisement message 34 to its attachment router 12a, which serves as the TLMR for the cluster 14a.

Hence, any mobile routers 12 of the cluster 14a that locate a border router from the second cluster 14b send a border router advertisement message, enabling the TLMR 12a to select a link for communication with the corresponding TLMR 12b of the overlapping cluster 14b, described below with respect to FIG. 6.

Figure 6:
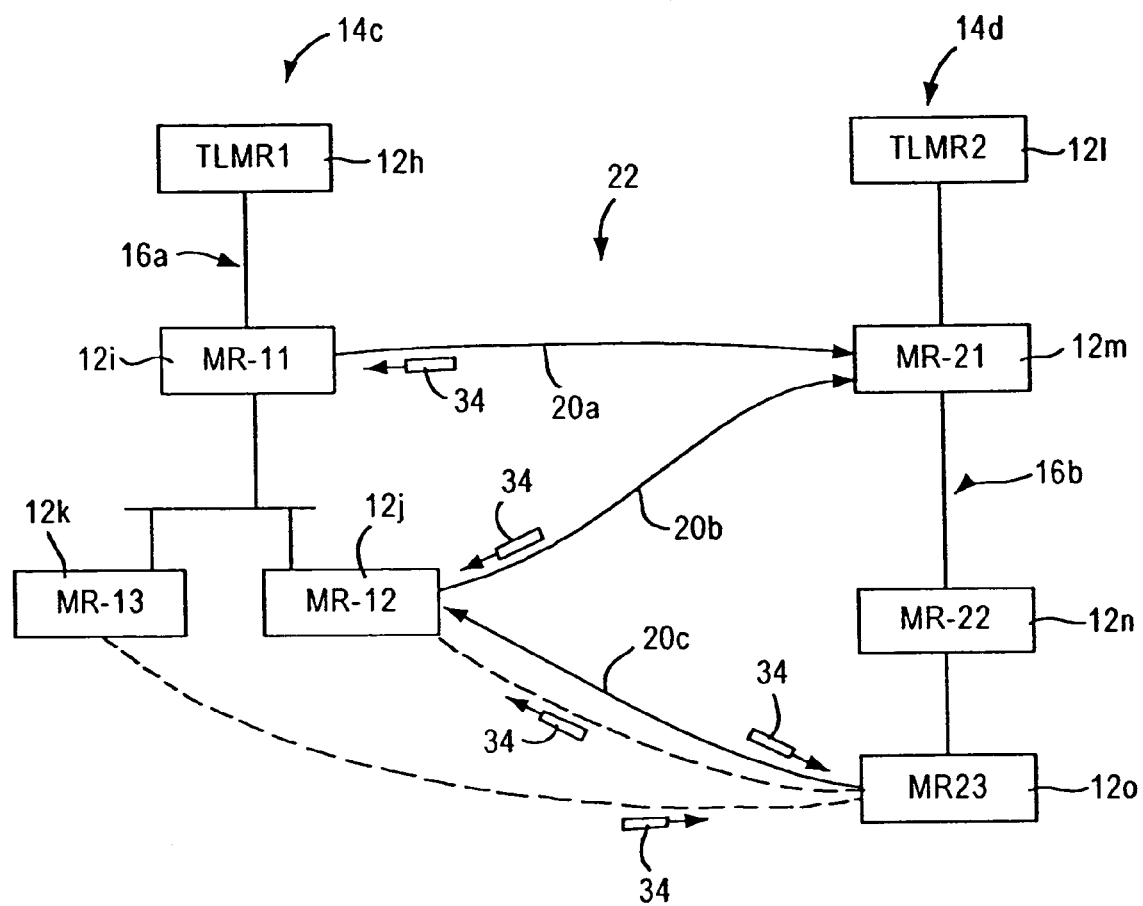
FIG. 6 is a diagram illustrating establishment of a virtual tunnel across the overlapping MANETs, according to an embodiment of the present invention.

FIG. 6 is a diagram illustrating establishment of the virtual tunnel 22 by the TLMRs 12 and 12b for emulation of two source route LANs (e.g., 14a and 14b) interconnected via two IP gateways (e.g., 12a and 12b) over a serial link 22, as illustrated in FIG. 1.

As illustrated in FIG. 6, the cluster 14c includes mobile routers 12h, 12i, 12j, and 12k, and the cluster 14d includes mobile routers 12l, 12m, 12n, and 12o. As illustrated in FIG. 6, the TLMRs of the clusters 14c and 14d are the mobile routers 12h and 12l, respectively.

Assume that overlap of the clusters 14c and 14d begins by the following: the mobile router 12o ("MR-23") detects router advertisement messages 34 from mobile router 12j ("MR-12") and 12k ("MR-13"); the mobile router 12j ("MR-12") detects router advertisement messages 34 from the mobile router 12o ("MR-23") and 12m ("MR-21"); and the mobile router 12i ("MR-11") detects a router advertisement message 34 from the mobile router 12m ("MR-21").

Although normally the detection of router advertisement messages from another cluster 14 may cause the trees 16a and 16b to reorganize, assume for discussion sake that each mobile router of FIG. 6 decides to remain in its current cluster 14c or 14d. Each mobile router (e.g., 12j) having received a router advertisement message from the overlapping cluster (e.g., 14d) adds to its corresponding internal routing table 33 a route to the TLMR (e.g., 12l) of the overlapping cluster via the mobile router having the highest preference (e.g., 12m preferred over 120), and sends a border router advertisement message to its TLMR (e.g., 12h) via its corresponding attachment router (e.g., 12i). Hence, the mobile router 12o ("MR-23") adds a route entry for reaching the TLMR 12h ("TLMR1") via the border router 12j ("MR-12"), and notifies the TLMR 12l ("TLMR2") about the reachability of the TLMR 12h ("TLMR1"); the router 12j ("MR-12") adds a route entry for reaching the TLMR 12l ("TLMR2") via the border router 12m ("MR-21") and notifies the TLMR 12h ("TLMR1") about the reachability of the TLMR 12l ("TLMR2"); the router 12i ("MR-11") adds a route entry for reaching the TLMR 12l ("TLMR2") via the border router 12m ("MR-21") and notifies the router 12h ("TLMR1") about the reachability of the router 12l ("TLMR2").

Once each TLMR 12h and 12l has received the reachability information via its corresponding set of border routers, each TLMR 12 creates a corresponding unidirectional virtual tunnel component to the overlapping cluster 14. Hence, TLMR1 creates a unidirectional component that includes selection of one of the intersystem links 20a or 20b via border gateways MR-11 and MR-12, respectively. The TLMR2 creates a unidirectional component from the intersystem link 20c via the only available border gateway, MR-23. Over time, other mobile routers may also provide connectivity to the remote cluster, in which cases they will be added to the virtual tunnel. On the other hand, existing border gateways may lose connectivity to the corresponding border router used to reach the remote cluster; in such cases, the border gateway informs its TLMR about that loss of connectivity. A border gateway also may drop out of the cluster in which case the clusterhead removes it from all virtual tunnels.

Hence, since any individual connection 20 may be unstable as the corresponding border routers move, the virtual tunnel 22 is abstracted as a much more stable serial link available for upper layer protocols. Redundant information or error recovery procedures may be applied to augment the probability to reach the other end. For example, depending on the measured stability of each path 20, the packets sent over the virtual tunnel 22 may actually be duplicated and transmitted over more than one path 20.

The stability and capability of the paths 20 in a virtual tunnel 22 may be evaluated using heuristic strategies, for example attempting transmission on each path 20 to determine which path provides the best connectivity performance. Statistical routing can then be applied to distribute the traffic. Additional details are described in "AntNet: Mobile Agents for Adaptive Routing" by Gianni Di Caro and Marco Dorigo (1997), available on the World Wide Web at http://dsp.jpl.nasa.gov/members/payman/swarm/dicaro97-iridia.pdf, the disclosure of which is incorporated in its entirety by reference.

The virtual tunnel 22 is presented to upper layer protocols as a serial link with the remote TLMR at the other end. As described above, a packet sent over the virtual link 22 is tunneled or source routed via one of the available border routers. In particular, the TLMR implementing the virtual tunnel 22 adds to each packet a routing header that leads to the corresponding selected border gateway, based on the source-route knowledge of its own cluster.

Hence, the transmitted packet would include an IP header specifying the TLMR within the source field (e.g., "TLMR2"), and the first hop router down the cluster source in the destination field (e.g., MR-21"). A routing header would include the sequence of IP addresses for the 2nd hop to the Nth hop (e.g., "MR-22"), the border gateway (e.g, "MR-23"), followed by the destination TLMR (e.g., "TLMR1").

Hence, the packet reaches the border gateway MR-23 using the source routing header. The border gateway 12o has a route to the remote TLMR-target 12h and forwards the packet to the other cluster. Then the packet follows the default path up the tree 16a to the TLMR 12h.

Hence, the clusters 14a and 14b can establish multiple intersystem links 20, enabling the top level mobile routers establish a link emulation, where the emulated point to point link 22 is substantially more stable than an individual link 20. Hence, the TLMRs 12a and 12b can establish a point to point link 22 based on selection of multiple available links 20 between border routers.

According to the disclosed embodiment, mobile routers can be configured to automatically select which router to attach to within a clustered network, implemented for example as a mobile ad hoc network, in a manner that enables selection according to prescribed network and topology based preferences. Hence, mobile routers can be configured to automatically form network topology models optimized for different selected priorities within a cluster network, and establish multiple connecting links for emulation of a point to point link between two emulated source route networks.

Hence, inter-network communication links between clusters can be maintained in a more stable manner than relying on an individual link.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a mobile router of a clustered network, the method comprising:
    establishing within the clustered network a network topology model, including:
    (1) outputting a first router advertisement message having tree information option fields specifying the mobile router as a top level mobile router, and a corresponding preference value,
    (2) receiving at least one second router advertisement message that includes information for reaching other mobile routers having sent the second router advertisement message, and the at least one second router advertisement message further including a corresponding tree information option field specifying the mobile router as the top level mobile router, and
    (3) storing the information for reaching the other mobile routers in a routing table;
    receiving a third advertisement message from one of the other mobile routers specifying information for reaching a second clustered network, the second clustered network reachable via a border router having connected with the clustered network; and
    storing the information for reaching the second clustered network in the routing table.

2. The method of claim 1, further comprising sending a fourth router advertisement message, to an identified top level mobile router of the second clustered network, specifying the network topology model.

3. The method of claim 2, further comprising:
    receiving a fifth advertisement message from a second of the other mobile routers specifying second information for reaching the second clustered network, the second clustered network further reachable via a second border router having connected with the clustered network; and
    storing the second information in the routing table for reaching the second clustered network.

4. The method of claim 3, further comprising selecting one of the border router and the second border router for reaching the second clustered network.

5. The method of claim 1, further comprising:
    receiving a fourth advertisement message from a second of the other mobile routers specifying second information for reaching the second clustered network, the second clustered network further reachable via a second border router having connected with the clustered network; and
    storing the second information in the routing table for reaching the second clustered network.

6. The method of claim 5, further comprising selecting one of the border router and the second border router for reaching the second clustered network.

7. A mobile router configured for establishing communications within a clustered network, the mobile router comprising:
    means for establishing within the clustered network a network topology model, based on:

(1) outputting a first router advertisement message having tree information option fields specifying the mobile router as a top level mobile router, and a corresponding preference value, (2) receiving at least one second router advertisement message that includes information for reaching other mobile routers having sent the second router advertisement message, and the at least one second router advertisement message further including a corresponding tree information option field specifying the mobile router as the top level mobile router, and (3) storing the information for reaching the other mobile routers in a routing table;

means for receiving a third advertisement message from one of the other mobile routers specifying information for reaching a second clustered network, the second clustered network reachable via a border router having connected with the clustered network; and means for storing the information for reaching the second clustered network in the routing table.

8. The mobile router of claim 7, further comprising means for sending a fourth router advertisement message, to an identified top level mobile router of the second clustered network, specifying the network topology model.

9. The mobile router of claim 8, wherein:

the receiving means is configured for receiving a fifth advertisement message from a second of the other mobile routers specifying second information for reaching the second clustered network, the second clustered network further reachable via a second border router having connected with the clustered network; and the storing means is configured for storing the second information in the routing table for reaching the second clustered network.

10. The mobile router of claim 9, further comprising means for selecting one of the border router and the second border router for reaching the second clustered network.

11. A mobile router configured for establishing communications within a clustered network, the mobile router comprising:

a circuit configured for generating a first router advertisement message having tree information option fields specifying the mobile router as a top level mobile router, and a corresponding preference value;

a network interface configured for receiving at least one second router advertisement message that includes information for reaching other mobile routers having sent the second router advertisement message, the at least one second router advertisement message further including a corresponding tree information option field specifying the mobile router as the top level mobile router; and a routing table configured for storing the information for reaching the other mobile routers;

the network interface configured for receiving a third advertisement message from one of the other mobile routers, the third advertisement message specifying information for reaching a second clustered network, the second clustered network reachable via a border router having connected with the clustered network;

the mobile router configured for storing the information for reaching the second clustered network in the routing table.

12. The mobile router of claim 11, wherein the mobile router is configured for sending a fourth router advertisement message, to an identified top level mobile router of the second clustered network, specifying a network topology model.

13. The mobile router of claim 12, wherein:

the network interface is configured for receiving a fifth advertisement message from a second of the other mobile routers specifying second information for reaching the second clustered network, the second clustered network further reachable via a second border router having connected with the clustered network; and the mobile router is configured for storing the second information in the routing table for reaching the second clustered network.

14. The mobile router of claim 13, wherein the mobile router is configured for selecting one of the border router and the second border router for reaching the second clustered network.

15. The mobile router of claim 11, wherein:

the network interface is configured for receiving a fourth advertisement message from a second of the other mobile routers specifying second information for reaching the second clustered network, the second clustered network further reachable via a second border router having connected with the clustered network; and the mobile router is configured for storing the second information in the routing table for reaching the second clustered network.

16. The mobile router of claim 15, wherein the mobile router is configured for selecting one of the border router and the second border router for reaching the second clustered network.

* * * * *

UNITED STATES PATENT AND TRADEMARK OFFICE
CERTIFICATE OF CORRECTION

PATENT NO. : 7,649,852 B2
APPLICATION NO. : 11/654625
DATED : January 19, 2010
INVENTOR(S) : Thubert et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 393 days.

Signed and Sealed this

Twenty-eighth Day of December, 2010

David J. Kappos
*Director of the United States Patent and Trademark Office*

UNITED STATES PATENT AND TRADEMARK OFFICE
CERTIFICATE OF CORRECTION

PATENT NO. : 7,649,852 B2  
APPLICATION NO. : 11/654625  
DATED : January 19, 2010  
INVENTOR(S) : Thubert et al.

Page 1 of 1

It is certified that error appears in the above-identified patent and that said Letters Patent is hereby corrected as shown below:

On the Title Page, Item (54) & Col. 1 line 2

In the title: please delete "ATTACHEMENTS" and insert --ATTACHMENTS-- therefor.

Signed and Sealed this  
Tenth Day of May, 2011

David J. Kappos  
*Director of the United States Patent and Trademark Office*